UNITED STATES PATENT OFFICE 2,650,915

DISAZO DYESTUFFS

Guido Schetty, Basel, Switzerland, assignor to J. R. Geigy A. G., Basel, Switzerland, a Swiss firm No Drawing. Application October 3, 1951, Serial No. 249,625. In Switzerland October 18, 1950

2 Claims. (Cl. 260—178)

The present invention relates to the production of new, valuable, blue-red disazo dyestuffs which are excellently suited for the dyeing of animal and related fibres from a neutral to weakly acid bath, and to the preparation of the said dyestuffs. In particular, they give very brilliant bluish-red wool dyeings which are characterised by their evenness, particularly by the even dyeing of both the roots and the tips of the hairs, and by their very good fastness to sea water, to milling and to light.

The disazo dyestuffs according to this invention are obtained by coupling 1 mol of a tetrazotised diamino compound of the general formula:

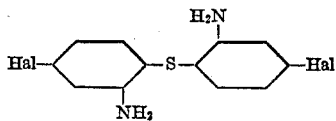

wherein Hal represents the halogen substituents usual in dyestuff components with 2 mols of 2-amino - 8 - hydroxynaphthalene - 6 - sulphonic acid in the 1-position. It is known that the 2-amino-8-hydroxynaphthalene can be coupled in the 1-position in an acid medium, i. e. at hydrogen ion concentrations under pH=7.

Apart from the bromine atom, preferably the chlorine atom comes into question as halogen substituent in the diamino compounds used according to the present invention. The disazo dyestuff obtained from tetrazotised 4.4'-dichloro-2.2'-diaminodiphenyl sulphide is particularly valuable because it is technically easily available.

The dyestuffs derived from 2.2'-diaminodiphenyl sulphide according to the present invention are superior in their drawing power on to wool from a neutral bath and in the fastness of their wool dyeings to sea water and milling to those derived from 4.4'- and 3.3'-diaminodiphenyl sulphones or sulphoxides disclosed in the U. S. Patent No. 2,405,835.

The following examples illustrate the invention without limiting it in any way. Where not otherwise stated, parts are given as parts by weight and the temperatures are in degrees centigrade. The relationship of parts by weight to parts by volume is that of kilogrammes to litres.

Example 1

14.25 parts of 4.4'-dichloro-2.2'-diamino-1-1'-diphenyl sulphide are dissolved in 90 parts of 93% sulphuric acid at 85°. The solution is then cooled to 10° whereupon 46.5 parts of 30% nitrosyl sulphuric acid are added. On completion of the tetrazotisation, 600 parts of ice are stirred in and the excess sulphuric acid is almost fully neutralised, preferably with alkali or earth alkali carbonate, at a temperature not exceeding +2°. The cleared, lemon-yellow almost neutralised but still acid to congo red tetrazo compound solution is added to a cold, acetic acid solution of the sodium salt of 24.6 parts of 2-amino - 8 - hydroxynaphthalene - 6 - sulphonic acid in 300 parts of water which contains a sufficient amount of sodium acetate to neutralise the greater part of the free mineral acid. After stirring for 30 hours at 20°, the solution is heated to 90° and made alkaline to litmus by the addition of sodium carbonate. The dyestuff is salted out and filtered off hot.

When dry, the dyestuff is a brown powder which dissolves in hot water with a bluish-red and in concentrated sulphuric acid with a brownish-violet colour. From a neutral or weakly acid dyebath, it dyes wool in even, bluish-red shades which have very good fastness to washing, milling, sea water and light.

A very similar dyestuff is obtained with 4.4'-dibromo-2.2'-diamino-1.1'-diphenyl sulphide.

4.4'-dichloro- and 4.4'-dibromo-2.2'-diamino-1.1'-diphenyl sulphide are obtained from the corresponding dinitro compounds (Beilstein and Kurbatow, Annalen 197, 79 (1879)) by reduction according to Béchamp.

Example 2

100 parts of wool flannel are entered at 45° in a bath containing 1 part of the dyestuff according to Example 1, 10 parts of Glauber's salts and 4 parts of acetic acid in 3000 parts of water. The bath is brought to the boil within 30 mintues and boiled for a further 30 minutes. 1 part of sulphuric acid is then added, the bath is boiled for another 15 minutes, after which the dyed goods are rinsed. A very level bluish-red wool dyeing is obtained which is very fast to milling, sea water and light.

A similar but just a little lighter dyeing is obtained if dyeing is performed without both the acetic and sulphuric acids and the bath after having been brought to the boil in ½ an hour is boiled for a further 1½ hours.

What I claim is:

1. A disazo dyestuff of the general formula:

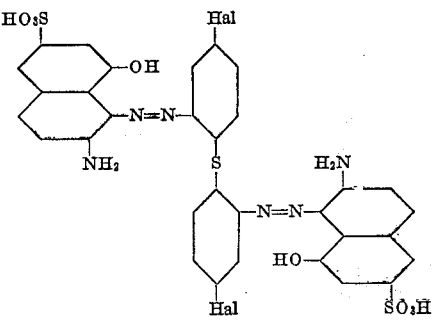

wherein Hal represents a halogen atom selected from the group consisting of Cl and Br atoms.

2. The disazo dyestuff of the formula:

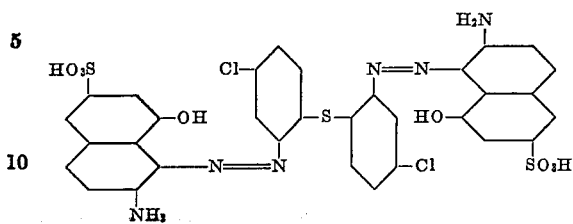

GUIDO SCHETTY.

References Cited in the file of this patent

UNITED STATES PATENTS

| Number | Name | Date |
|---|---|---|
| 1,821,256 | Brightman et al. | Sept. 1, 1931 |
| 2,405,835 | Krebser | Aug. 13, 1946 |